D. L. EMERSON.
Harvester.
No. 39,559.
2 Sheets—Sheet 1.
Patented Aug. 18, 1863.
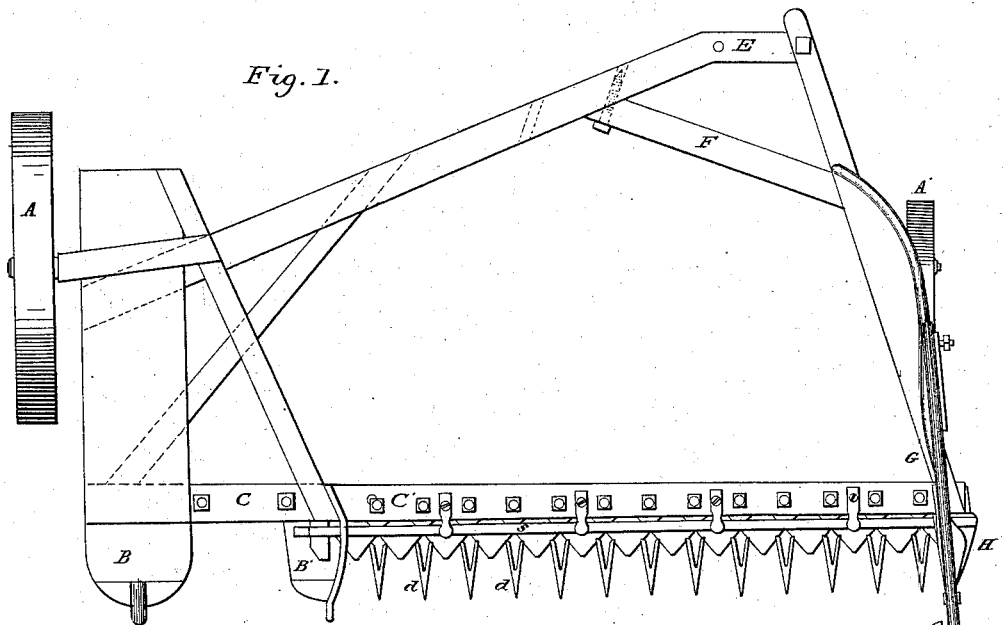
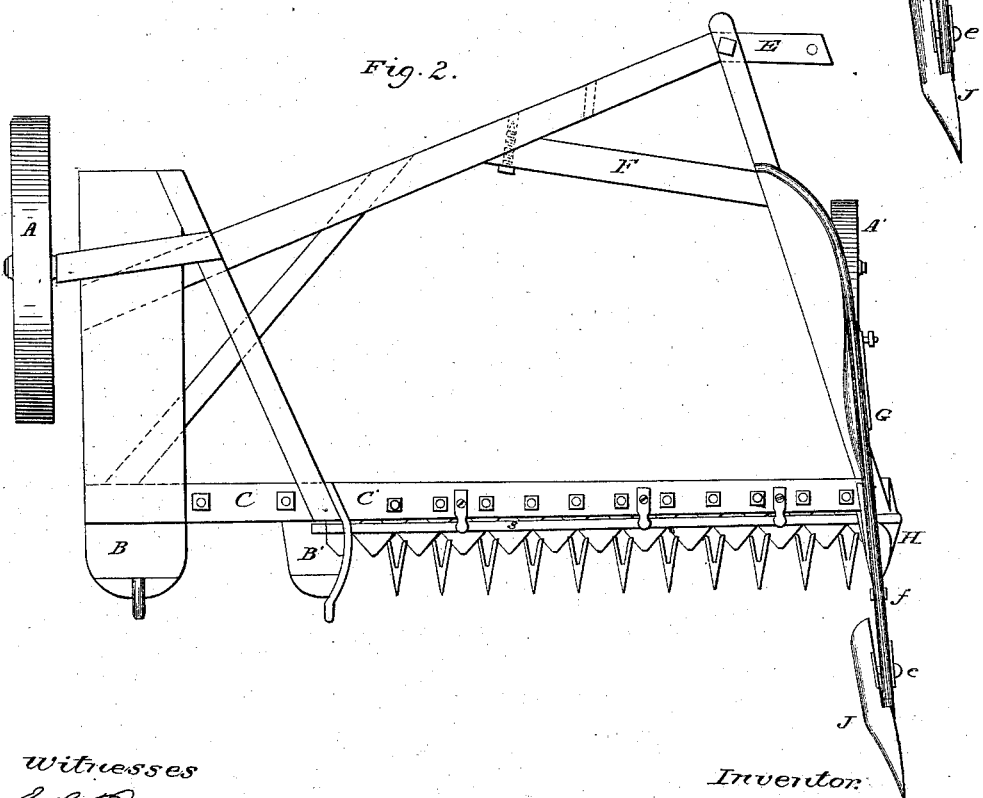
Witnesses
Inventor
Daniel L. Emerson D. L. EMERSON.
Harvester.

No. 39,559.

2 Sheets—Sheet 2.

Patented Aug. 18, 1863.

Witnesses.

Inventor:
Daniel L. Emerson.

UNITED STATES PATENT OFFICE.

DANIEL L. EMERSON, OF ROCKFORD, ILLINOIS.

IMPROVEMENT IN HARVESTERS.

Specification forming part of Letters Patent No. 39,559, dated August 18, 1863.

*To all whom it may concern:*

Be it known that I, DANIEL L. EMERSON, of Rockford, in the county of Winnebago and State of Illinois, have invented certain new and useful Improvements in Harvesting-Machines; and I do hereby declare that the following is a full, clear, and exact description of my said invention, reference being had to the accompanying drawings, in which—

Figure 3:
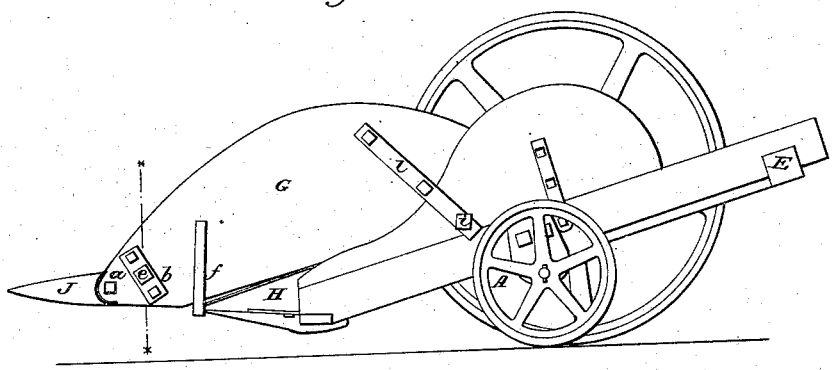
Figure 4:
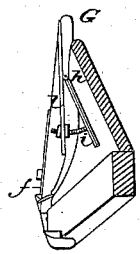
Figure 5:
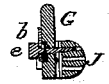
Figure 7:
Figure 6:
Figure 8:

Figure 1 represents a plan of the frame of the machine extended to cut grain, and with the raking-platform removed to show the construction of the parts beneath that platform. Fig. 2 represents a plan of the frame of the machine contracted to cut grass. Fig. 3 represents an elevation of the grain side of the machine. Fig. 4 represents a vertical section of the grain side of the machine at the line $x$ $x$ of Fig. 3 and looking forward. Fig. 5 represents a vertical section of the divider at the line * * of Fig. 3. Fig. 6 represents a vertical longitudinal section of a part of the extensible finger-beam. Fig. 7 represents a view of the inner side of the adjustable divider-point, and Fig. 8 represents a transverse section of the sickle upon an enlarged scale.

My invention has reference particularly to what are termed "combined harvesting-machines" suitable for both cutting grain and mowing grass; but it is applicable to machines for performing only one of these operations.

The object of the first part of my invention is to enable the same machine to cut a wide swath of grain and a narrower swath of grass. Experience has shown that in mowing the breadth of the swath cut is best when from four and a half to five feet, because the average strain upon the team becomes too great when the breadth of the cut is increased. On the other hand, grain when in good order is cut with less power than grass. Hence the same team which can cut a swath of average grass five feet wide with facility can cut a swath of average grain of six feet in breadth with about equal facility.

The first part of my invention enables the machine to cut either a narrow swath or a wide swath, so that it can be used to the best advantage in both grass and grain. This part of my invention consists in an extensible finger-beam formed of parts, one of which can have its position changed in reference to the other by overlapping it to a less or greater extent, so that a greater or less number of fingers or guards can be used, according to the breadth of the swath to be cut.

The object of the second part of my invention is to enable the first part thereof to be applied to that class of harvesting-machines which have a back beam parallel, or thereabout, with the sickle-bar and connected with the divider; and it consists in the combination of an extensible finger-beam with a back beam which is fitted to secure the rear of the divider-frame at greater or less distances from the line of draft, according to the set of the extensible finger-beam.

The third part of my invention has reference to the divider, and its object is to enable more or less stalks to be gathered into the sickle. This result has been accomplished previous to my invention by constructing the divider in parts, one of which was pivoted to the other so that it could be turned laterally; but the arrangement was defective.

The third part of my invention obviates the defects of the preceding plan; and it consists in combining the lower edge of the gathering board or wing of the divider with the remainder thereof by hinge-connections and a controlling-instrument in such manner that the gathering-board can be set upright or leaned outward to give it more or less inclination, and thus gather in less or more grain to the sickle.

The fourth part of my invention has also reference to the divider; and it consists in combining the point of the divider with the remainder of the same by fastenings in such manner that it can be moved both sidewise and up and down, so as to permit its front end to be set out or in to gather more or less grain to the sickle, and also up or down to run nearer to or farther from the plane of progression of the sickle, so that it may raise up the greatest possible quantity of depressed stalks and save them from being run over by the grain-wheel or other part of the machine in the rear of the divider-point.

All the parts of my invention are embodied in the machine, parts of which are represented in the accompanying drawings. This machine has the general form and arrangement of the Manny harvesting-machine, its main frame being supported upon wheels A and A', the former of which is the driving-wheel, and the latter the grain-wheel at the divider side of the machine. This frame carries the cutting apparatus, the divider, the raking-platform, the reel, and the gearing for imparting motion to the sickle, reel, &c. It is fitted at its front side with two shoes, B B′, having ears at their front ends with which the reach or the tongue is connected, as is usual in the Manny machine.

In order to embody the first part of my invention, the finger-beam is made in two parts, C and C′, one of which, C, is secured to the main frame and to the shoes B B′, while the other part, C′, slides beneath the first, the shoe B′ being so constructed that it permits the part C′ to slide through it. The two parts of the finger-beam are perforated with holes for screw-bolts, by which the two parts of the finger-beam are secured together, and the fingers $dd$, which are at the stubble end of the finger-beam, are secured to it by screws or screw-bolts, so that they can be readily removed when the finger-beam is to be contracted, as it is at Fig. 2, or can be reapplied when the finger-beam is extended, as it is at Fig. 1. From this construction of the finger-beam in parts, one of which overlaps the other, it is plain that by sliding the one part, C′, along the other part, C, the effective length of the finger-beam can be increased or diminished. The farmer therefore has it in his power to regulate the length of his finger-beam to the breadth of the swath to be cut. In order to cut effectually with the finger-beam in either its contracted or extended condition, two sickles are furnished with the machine, one sickle for the finger-beam when extended and the other for it when contracted. This first part of my invention may be applied to machines without a back beam.

The second part of my invention enables the first part to be applied with facility to frame-machines similar to the Manny machine. In order to embody it in the machine, the back beam, E, is made of the full length required to hold the hinder end of the grain side of the main frame, which may be termed the "divider-frame," when the finger-beam is extended, as at Fig. 1, and is, in addition, arranged to hold the hinder end of the grain side of the main frame when the finger-beam is contracted, as at Fig. 2. It is perforated with bolt-holes in proper positions to receive the bolt that secures the hinder end of the grain side of the main frame to the back beam in its two different positions, and also for the bolt that secures the brace F to the back beam, so that when the farmer wishes to contract or extend his finger-beam he can vary the position of the grain side of the main frame accordingly, and can secure it firmly to the back beam by a bolt in whichever position it may be placed.

In order to embody the third part of my invention, the wing G of the divider is connected at its lower edge with the machine by two connections, $f$ $h$, which operate as hinges upon which the wing can be turned out or in to make it more or less inclined. The forward connection, $f$, encircles the point of the stationary metal divider or shoe H, so that this point acts as the joint-pin for the hinge. The hinder connection has the form of a strap-hinge. In order to hold the wing at any inclination it may be desirable to place it, a curved screw-bolt, $i$, is secured to the stationary part of the machine in a proper position to pass through a slot in a controlling-arm, $l$, secured to the wing G. This screw-bolt is provided with two nuts, one of which is on the outside of the arm $l$ and the other inside of it, so that by screwing these nuts along the screw-bolt the arm $l$ and the wing G, from which it is projected, may be adjusted and secured in any position within the range of the adjustment-bolt. The wing projects in advance of a fixed shoe, H, and carries the divider-point, which is used when grain is to be harvested. As the line upon which the wing turns at its lower edge is inclined to the line of projection of the point of divider in advance of the finger-beam, it follows that the inclining of the wing outward from the raking-platform moves the divider-point outward, and thus enables it to gather in more grain to the sickle, while the setting of the wing more upright moves the divider-point inward, and enables it to gather in less grain to the sickle.

The fourth part of my invention, when used in connection with the third part, enables the farmer to vary the range of gather of the divider-point still further than the third part of my invention would without it, and in addition permits the farmer to adjust the vertical position of the extremity of the divider-point so as to run as closely as possible to the ground. To this end the divider-point J is made an independent instrument, and is adjustable both vertically and horizontally. In order to enable it to be adjusted horizontally, it is connected with the wing G (or its equivalent for holding the divider-point) by means of a swivel-bolt, $a$, that, while holding the divider-point, permits it to be turned. The divider-point is also connected at its butt with the wing G by means of an adjusting-screw, $e$, which turns in a plate, $b$, secured to the wing. This screw screws into a plate secured to the divider-point, and its head held in its place against the wing-plate $b$ by means of a pin on the inner side of that plate. Hence by turning this screw the butt of the divider-point is moved from or toward the adjacent face of the wing G, and the extreme end of the divider is set so as to gather in more or less grain to the sickle. In order to permit the divider-point to be adjusted vertically as well as horizontally, several screwed holes are made in the plate at the butt of the divider to any one of which the screw $e$ may be shifted as required to cause the divider-point to run nearer to or farther from the ground or nearer to or farther from the plane in which the sickle progresses. The screw-holes of this series are arranged in the arc of a circle of which the swivel-bolt $a$ is the center. The swivel-bolt, screw-bolt, and their appurtenances constitute the best fastenings with which I am acquainted for combining the divider-point with the remainder of the divider so as to permit of movement in two directions, as before stated. In order to prevent the accumulation of stalks or other clogging matter at the joint between the divider-point and the remainder of the divider, the fore part of the divider-point is constructed to overlap the part of the divider to which it is fastened, as shown at Figs. 1, 2, and 3. This fourth part of my invention may be used in connection with the third part or not, as deemed expedient.

The sickle of the machine represented in the drawings is made with what may be termed a "duplex stock"—that is to say, there is one stock, $m$, beneath the sections which form the scalloped blade, and another stock, $s$, above those sections. The latter extends from one end of the sickle to the other, is riveted securely to the stock beneath and to the sectional blades, and constitutes the bar-slide which runs in the guides over the sickle. As this bar extends on each side of each top guide a greater distance (when the sickle is in its mean position) than the radius of the crank that drives the sickle, each guide is always in contact with a continuous smooth surface. Moreover, as the bar-slide extends up to the connection with the pitman the sickle is strengthened at the point where it is most liable to be broken—that is, near the connection with the pitman.

The first and second parts of my invention will frequently be advantageous in machines for cutting grain alone, as the farmer can cut a wide or narrow swath, according as his grain is light or heavy. In this case two raking-platforms may be provided with the machine, one for each effective length of finger-beam; but I prefer to provide a raking-platform for the finger-beam in its contracted condition, and an apron or supplemental piece to bridge over the space left between such a platform and the gathering-board when the finger-beam is extended to its longest range. The reel should also be adapted to the two positions of the divider, which may be done by constructing it with sliding gudgeons, so that the shaft of the reel may be said to be extensible to correspond with the extensible finger-beam.

Having thus described a machine embodying my invention, I deem it proper to state that I have not deemed it necessary to describe in detail those parts of the machine which have not been improved by me, as the general construction of harvesting-machines is well understood at the present day. I have described the best methods with which I am acquainted of embodying my invention, but do not limit my invention to the peculiarities of those modes.

What I claim as my invention, and desire to secure by Letters Patent, is—

1. An extensible finger-beam constructed of parts combined together in such manner that one part overlaps another, so as to be capable of extension and contraction by overlapping the parts less or more, substantially as herein set forth.

2. The combination of an extensible finger-beam with a back beam adapted to secure the rear of the divider-frame in different positions, substantially as herein set forth.

3. The combination of the gathering-board of the divider at its lower edge with the fixed part of the divider, by means of hinge-connections and an adjustable controlling-instrument, in such manner that this board can be set at a greater or less inclination to gather in less or more grain, substantially as herein set forth.

4. The combination of the divider-point with the remainder of the divider by fastenings in such manner that it can be set in different positions both laterally and vertically, substantially as herein set forth.

In testimony whereof I have hereunto subscribed my hand this 2d day of October, 1862.

DANL. L. EMERSON.

Witnesses:
  E. S. RENWICK,
  W. L. BENNEM.